(12) United States Patent
Ayuzawa

(10) Patent No.: US 11,230,082 B2
(45) Date of Patent: Jan. 25, 2022

(54) AUTOMOBILE FLOOR PANEL AND AUTOMOBILE FLOOR PANEL MANUFACTURING METHOD

(71) Applicant: HONDA MOTOR CO., LTD., Tokyo (JP)

(72) Inventor: Shotaro Ayuzawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/338,823

(22) PCT Filed: Jul. 31, 2017

(86) PCT No.: PCT/JP2017/027735
§ 371 (c)(1),
(2) Date: Apr. 2, 2019

(87) PCT Pub. No.: WO2018/078990
PCT Pub. Date: May 3, 2018

(65) Prior Publication Data
US 2020/0047449 A1    Feb. 13, 2020

(30) Foreign Application Priority Data
Oct. 24, 2016    (JP) .............................. JP2016-207672

(51) Int. Cl.
*B32B 3/12*    (2006.01)
*B21D 26/021*    (2011.01)
(Continued)

(52) U.S. Cl.
CPC .............. *B32B 3/12* (2013.01); *B21D 26/021* (2013.01); *B21D 47/00* (2013.01); *B32B 7/12* (2013.01);
(Continued)

(58) Field of Classification Search
None
See application file for complete search history.

(56) References Cited

U.S. PATENT DOCUMENTS 2,481,046 A * 9/1949 Scurlock ............... E04C 2/3405
428/593
3,011,602 A    12/1961 Ensrud et al.
(Continued)

FOREIGN PATENT DOCUMENTS

CN    1373708 A    10/2002
CN    1636817 A    7/2005
(Continued)

OTHER PUBLICATIONS

Machine translation of JP 2015-063207A {translated Jul. 8, 2020 expacenet.con} (Year: 2015).*
(Continued)

*Primary Examiner* — David Sample
*Assistant Examiner* — Elizabeth Collister
(74) *Attorney, Agent, or Firm* — Westerman, Hattori, Daniels & Adrian, LLP

(57) ABSTRACT

A vehicle floor panel is provided in which a honeycomb core made of metal sandwiched and adhered between two CFRP plates is one in which a large number of core units formed into a polygon shape are continuous within one plane so as to share a side of the polygon. Since closed-section parts formed by a hat-shaped cross section part formed along the side and one CFRP plate are continuous with each other at a vertex of the polygon of the adjacent core units, not only is it possible to lighten the weight by opening the interior of the polygon (P) shape core unit, but it is also possible to enhance the energy-absorbing performance by dispersing and transmitting a collision load inputted into one direction of the floor panel toward a plurality of other directions
(Continued)

because the high strength load transmission path is continuous with other load transmission paths.

11 Claims, 6 Drawing Sheets

(51) Int. Cl.
  *B21D 47/00* (2006.01)
  *B32B 7/12* (2006.01)
  *B32B 15/14* (2006.01)
  *B32B 37/12* (2006.01)
  *B62D 25/20* (2006.01)
  *B62D 29/00* (2006.01)
  *B32B 15/20* (2006.01)
  *B62D 29/04* (2006.01)

(52) U.S. Cl.
  CPC .............. *B32B 15/14* (2013.01); *B32B 15/20* (2013.01); *B32B 37/12* (2013.01); *B62D 25/20* (2013.01); *B62D 29/005* (2013.01); *B62D 29/008* (2013.01); *B62D 29/043* (2013.01); *B32B 2605/006* (2013.01)

(56) References Cited

U.S. PATENT DOCUMENTS

| | | | |
|---|---|---|---|
| 4,489,123 A * | 12/1984 | Schijve | B64C 1/12 428/213 |
| 4,631,221 A | 12/1986 | Disselbeck et al. | |
| 4,734,303 A * | 3/1988 | Fujiwara | B32B 15/08 428/35.9 |
| 5,399,406 A | 3/1995 | Matsuo et al. | |
| 9,598,120 B2 | 3/2017 | Ishii et al. | |
| 9,981,699 B2 | 5/2018 | Ayuzawa et al. | |
| 2003/0131646 A1 | 7/2003 | Herzog et al. | |
| 2011/0095574 A1 | 4/2011 | Brown | |
| 2012/0021169 A1 * | 1/2012 | Take | E04C 2/292 428/117 |
| 2015/0027629 A1 | 1/2015 | Butler et al. | |
| 2017/0239916 A1 * | 8/2017 | Lewit | B32B 27/20 |

FOREIGN PATENT DOCUMENTS

| | | | |
|---|---|---|---|
| CN | 1760027 A | | 4/2006 |
| CN | 201154563 Y | | 11/2008 |
| CN | 104494214 A | | 4/2015 |
| CN | 113302115 A | | 8/2021 |
| DE | 10100914 A1 | | 7/2002 |
| DE | 102004002276 A1 | | 9/2005 |
| JP | 48-105214 U | | 12/1973 |
| JP | 49-114685 A | | 11/1974 |
| JP | 60-229745 A | | 11/1985 |
| JP | S63232083 A | | 9/1988 |
| JP | H01-197020 A | | 8/1989 |
| JP | 6-226889 A | | 8/1994 |
| JP | 6-316015 A | | 11/1994 |
| JP | 2001-058220 A | | 3/2001 |
| JP | 2002-127942 A | | 5/2002 |
| JP | 2004-255983 A | | 9/2004 |
| JP | 2007-69888 A | | 3/2007 |
| JP | 2008-518818 A | | 6/2008 |
| JP | 2013-220648 A | | 10/2013 |
| JP | 2015-63207 A | | 4/2015 |
| JP | 2015-199320 A | | 11/2015 |
| WO | 2014/102867 A1 | | 7/2014 |
| WO | 2015/129110 A1 | | 9/2015 |
| WO | 2015/148707 A1 | | 10/2015 |
| WO | 2015/185925 A1 | | 12/2015 |

OTHER PUBLICATIONS

Office Action dated Oct. 30, 2019, issued in counterpart JP Application No. 2018-547133, with English translation. (10 pages).
International Search Report dated Aug. 29, 2017, issued in counterpart application No. PCT/JP2017/027735, w/ English translation (5 pages).
Office Action dated Jan. 20, 2021, issued in counterpart CN Application No. 201780065300.X, with English Translation. (29 pages).
Office Action dated Nov. 3, 2021, issued in counterpart CN application No. 201780065300.X. (5 pages).

* cited by examiner

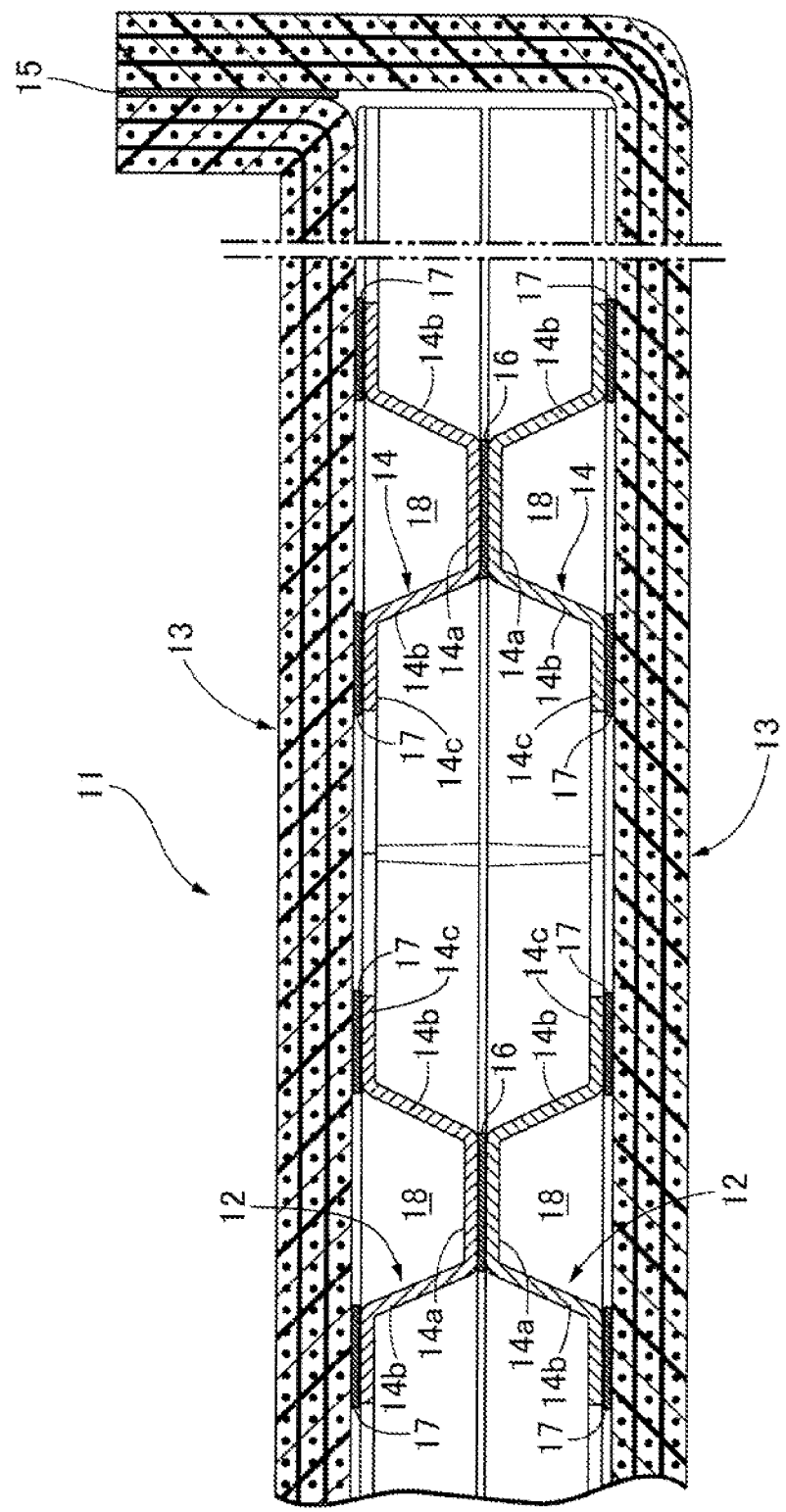

AUTOMOBILE FLOOR PANEL AND AUTOMOBILE FLOOR PANEL MANUFACTURING METHOD

TECHNICAL FIELD

The present invention relates to an automobile floor panel in which a honeycomb core, made of metal, is sandwiched between two CFRP plates and adhered, and to a manufacturing method for the automobile floor panel.

BACKGROUND ART

A honeycomb panel for use as a wall panel of a structure, etc. that is formed from a honeycomb core having a large number of convex parts formed by subjecting a metal plate such as aluminum to drawing or press-forming, and a surface material such as a urethane resin or an epoxy resin adhered to opposite faces of the honeycomb core is known from Patent Document 1 below.

RELATED ART DOCUMENTS

Patent Documents

Patent Document 1: Japanese Patent Application Laid-open No. 6-316015

SUMMARY OF THE INVENTION

Problems to be Solved by the Invention

This type of honeycomb panel has a large strength toward a load inputted in a direction orthogonal to the face of the honeycomb core but does not have sufficient strength toward a load inputted in a direction parallel to the face of the honeycomb core; therefore, when the above conventional honeycomb panel is used as an automobile floor panel, if a collision load in a direction parallel to the face of the honeycomb core is inputted, there is a possibility that it will not be possible to obtain a sufficient energy-absorbing effect.

The present invention has been accomplished in light of the above circumstances, and it is an object thereof to provide an automobile floor panel that can easily be produced and has a high strength toward a load inputted in a direction parallel to the face of a honeycomb core.

Means for Solving the Problems

In order to attain the above object, according to a first aspect of the present invention, there is provided an automobile floor panel in which a honeycomb core made of metal is sandwiched between two CFRP plates and adhered, wherein the honeycomb core is one in which a large number of core units formed into a polygon shape are continuous within one plane so as to share a side of the polygon, the side forms a hat-shaped cross section part having a top face, a pair of side faces and a pair of flange faces, and closed cross-section parts formed by adhering one of the CFRP plates to the pair of flange faces and linearly extending along the side are continuous with each other at a vertex of the polygon of the adjacent core units.

Further, according to a second aspect of the present invention, in addition to the first aspect, the core unit is a square shape or an equilateral triangle shape.

Furthermore, according to a third aspect of the present invention, in addition to the first or second aspect, a pair of the honeycomb cores are adhered to each other via the top face of the hat-shaped cross section part.

Moreover, according to a fourth aspect of the present invention, in addition to the third aspect, the flange face of the hat-shaped cross section part of the pair of honeycomb cores is adhered to the CFRP plate by an urethane-based adhesive having a modulus of elasticity of 10 to 120 MPa.

Further, according to a fifth aspect of the present invention, in addition to the third or fourth aspect, the top faces of the hat-shaped cross section parts of the pair of honeycomb cores are adhered to each other by an epoxy-based adhesive.

Furthermore, according to a sixth aspect of the present invention, in addition to any one of the first to fifth aspects, end parts of the two CFRP plates are adhered to each other by an epoxy-based adhesive.

Moreover, according to a seventh aspect of the present invention, in addition to the third or fourth aspect, the top faces of the hat-shaped cross section parts of the pair of honeycomb cores are adhered to each other by an urethane-based adhesive having a modulus of elasticity of 10 to 120 MPa.

Further, according to an eighth aspect of the present invention, in addition to any one of the first to seventh aspects, the side faces of hat-shaped cross section parts that are adjacent to each other are continuous while being smoothly curved.

Furthermore, according to a ninth aspect of the present invention, in addition to any one of the first to eighth aspects, there is provided a manufacturing method for the automobile floor panel, wherein an adhesive is cured by induction heating the honeycomb core by an IH heater.

Moreover, according to a tenth aspect of the present invention, in addition to any one of the first to eighth aspects, there is provided a manufacturing method for the automobile floor panel, wherein the honeycomb core is manufactured by deep drawing an aluminum plate by blow molding.

Effects of the Invention

In accordance with the first aspect of the present invention, the honeycomb core made of metal sandwiched and adhered between the two CFRP plates is one in which a large number of core units formed into a polygon shape are continuous within one plane so as to share a side of the polygon. Since the side of the polygon forms the hat-shaped cross section part having a top face, a pair of side faces and a pair of flange faces, and the closed cross-section parts formed by adhering one CFRP plate to the pair of flange faces and extending linearly along a side are continuous with each other at the vertex of the polygons of adjacent core units, not only is it possible to lighten the weight by opening the interior of the polygonal core unit, but it is also possible to enhance the energy-absorbing performance by dispersing and transmitting a collision load inputted into one direction of the floor panel toward a plurality of other directions because the high strength load transmission path formed from the linearly extending closed cross-section part is continuous with a plurality of other load transmission paths at the vertex of the polygons of the core units. Moreover, since the honeycomb core made of metal can be press formed, it can be manufactured inexpensively in a short period of time.

Furthermore, in accordance with the second aspect of the present invention, since the core unit is a square or an equilateral triangle shape, it becomes possible to apply an adhesive for adhering the CFRP plate linearly along the top face of the hat-shaped cross section part, thus improving the productivity.

Moreover, in accordance with the third aspect of the present invention, since the pair of honeycomb cores are adhered to each other via the top faces of the hat-shaped cross section parts, even for a pressed honeycomb core that has a small thickness due to the difficulty of deep drawing, a floor panel having a required plate thickness can be obtained by making it as two layers.

Furthermore, in accordance with the fourth aspect of the present invention, since the flange faces of the hat-shaped cross section parts of the pair of honeycomb cores are adhered to the CFRP plate with a urethane-based adhesive having a modulus of elasticity of 10 to 120 MPa, it is possible to suppress vibration of the CFRP plate, which is hard and easily transmits vibration, by a soft urethane-based adhesive.

Moreover, in accordance with the fifth aspect of the present invention, since the top faces of the hat-shaped cross section parts of the pair of honeycomb cores are adhered to each other with an epoxy-based adhesive, it is possible to strongly adhere the pair of honeycomb cores with a high strength epoxy-based adhesive, and, moreover, since the same type of materials are adhered to each other, the adhesive strength is further improved.

Furthermore, in accordance with the sixth aspect of the present invention, since end parts of the two CFRP plates are adhered to each other with an epoxy-based adhesive, it is possible to strongly adhere the CFRP plates with a high strength epoxy-based adhesive and, moreover, since the same type of materials are adhered to each other the adhesive strength is further improved.

Moreover, in accordance with the seventh aspect of the present invention, since the top faces of the hat-shaped cross section parts of the pair of honeycomb cores are adhered to each other with a urethane-based adhesive having a modulus of elasticity of 10 to 120 MPa, a flexible urethane-based adhesive layer is formed between the pair of honeycomb cores, thus suppressing vibration of the floor panel.

Furthermore, in accordance with the eighth aspect of the present invention, since the side faces of the hat-shaped cross section parts that are adjacent to each other are continuous with each other while being smoothly curved, a load that is inputted into the vertex along one side of the polygon can be efficiently transmitted from the vertex along the plurality of sides.

Moreover, in accordance with the ninth aspect of the present invention, since the adhesive is cured by induction heating the honeycomb core by an IH heater, it is possible to shorten the curing time for the adhesive, thus enhancing the production efficiency.

Furthermore, in accordance with the tenth aspect of the present invention, since the honeycomb core is manufactured by deep drawing an aluminum plate by blow molding, compared with a case in which an aluminum plate having the same plate thickness is press formed, deep drawing becomes possible, and a floor panel having a required plate thickness can be obtained without forming the honeycomb core as two layers, thus reducing the number of components and the production cost.

BRIEF DESCRIPTION OF DRAWINGS

FIG. 6 is a diagram corresponding to FIG. 1. (third embodiment)

EXPLANATION OF REFERENCE NUMERALS AND SYMBOLS

Figure 1:
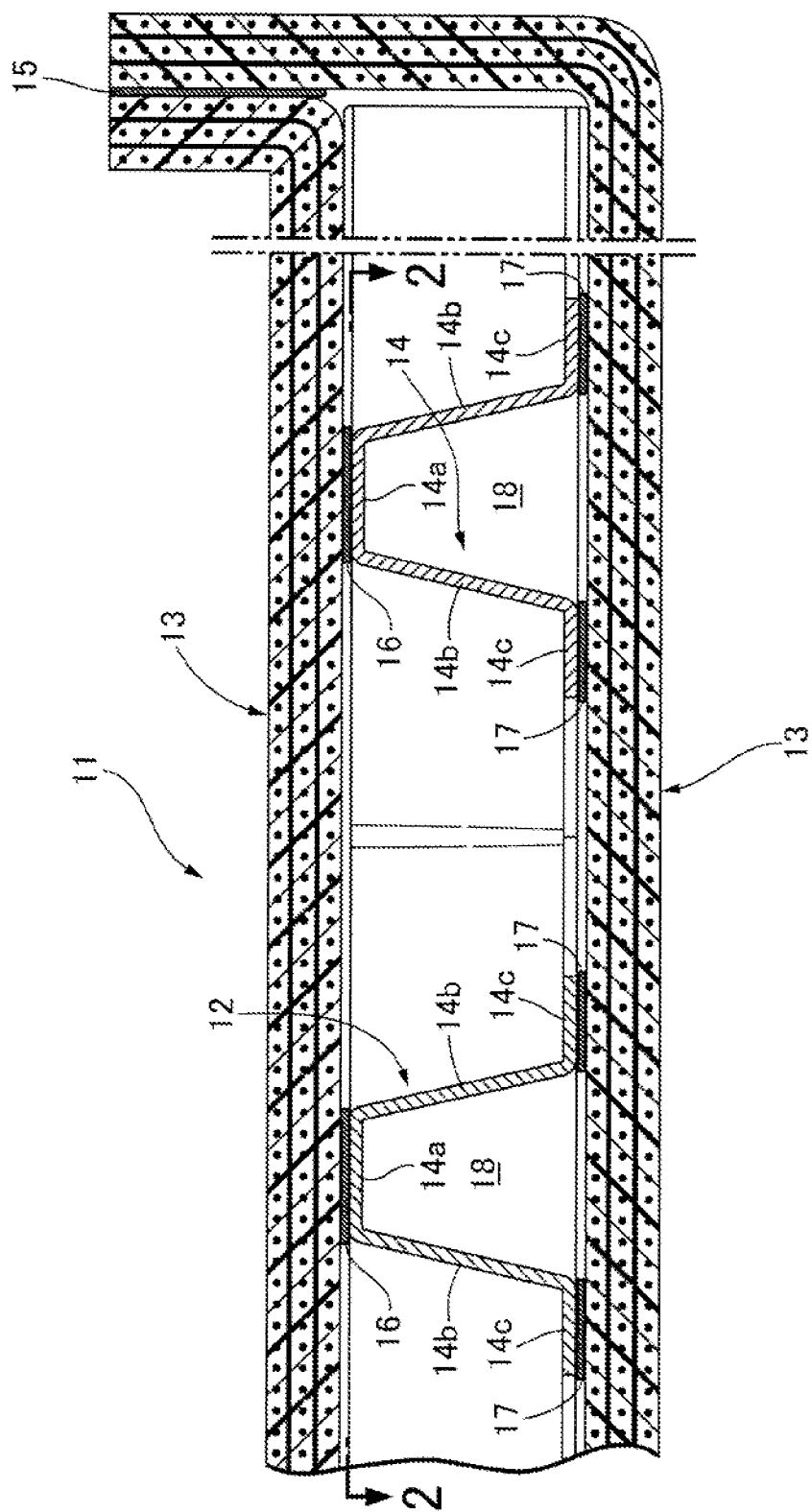
FIG. 1 is a sectional view of a honeycomb panel (sectional view along line 1-1 in FIG. 2). (first embodiment)

12 Honeycomb core
13 CFRP plate
14 Core unit
14a Top face
14b Side face
14c Flange face
15 Adhesive
16 Adhesive
17 Adhesive
18 Closed cross-section part
P Polygon
S Side
V Vertex

MODES FOR CARRYING OUT THE INVENTION

Embodiments of the present invention are explained by reference to the attached drawings.

First Embodiment

A first embodiment of the present invention is explained below by reference to FIG. 1 to FIG. 4.

Figure 2:
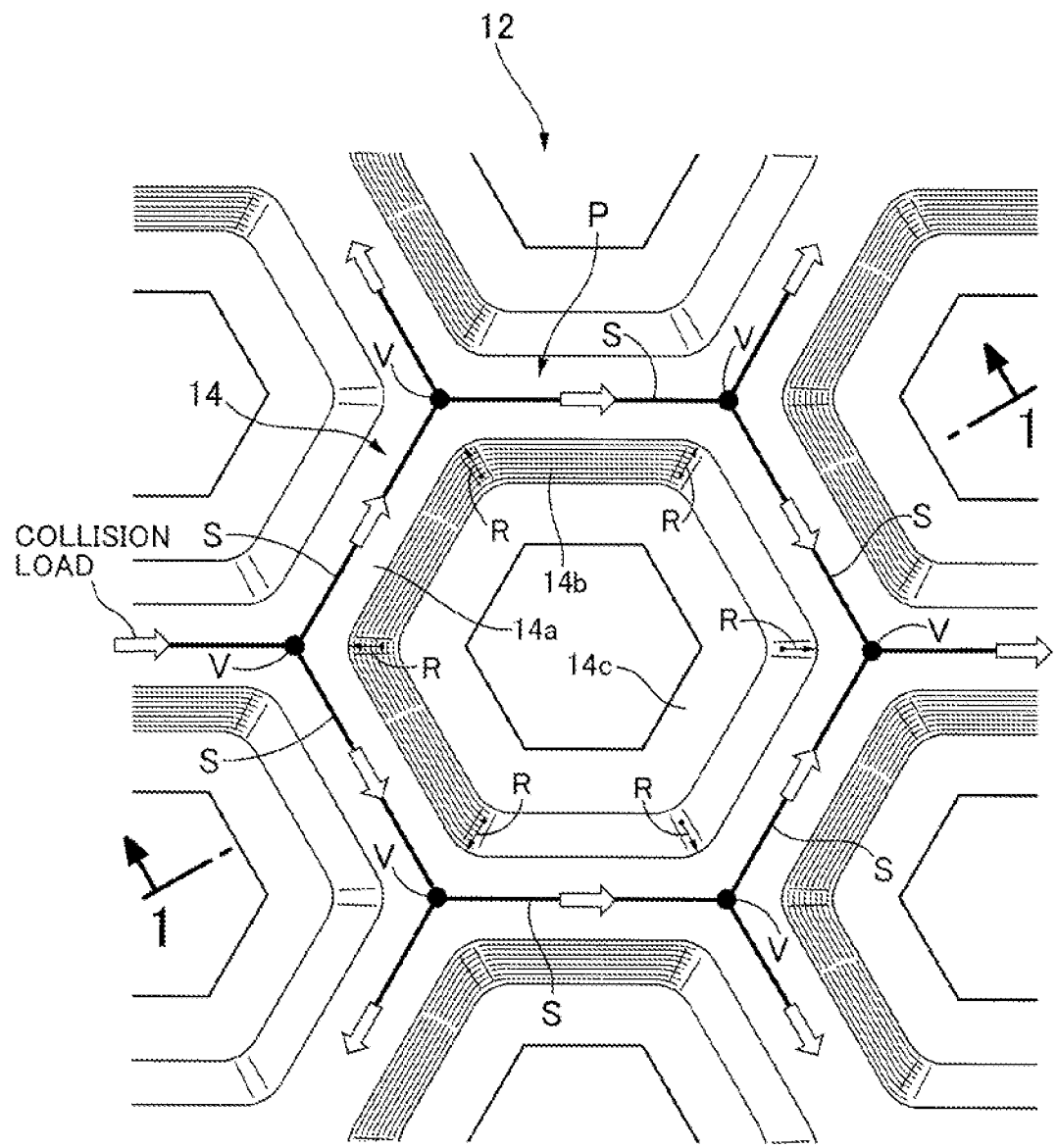
FIG. 2 is a view from arrowed line 2-2 in FIG. 1. (first embodiment)
Figure 3:
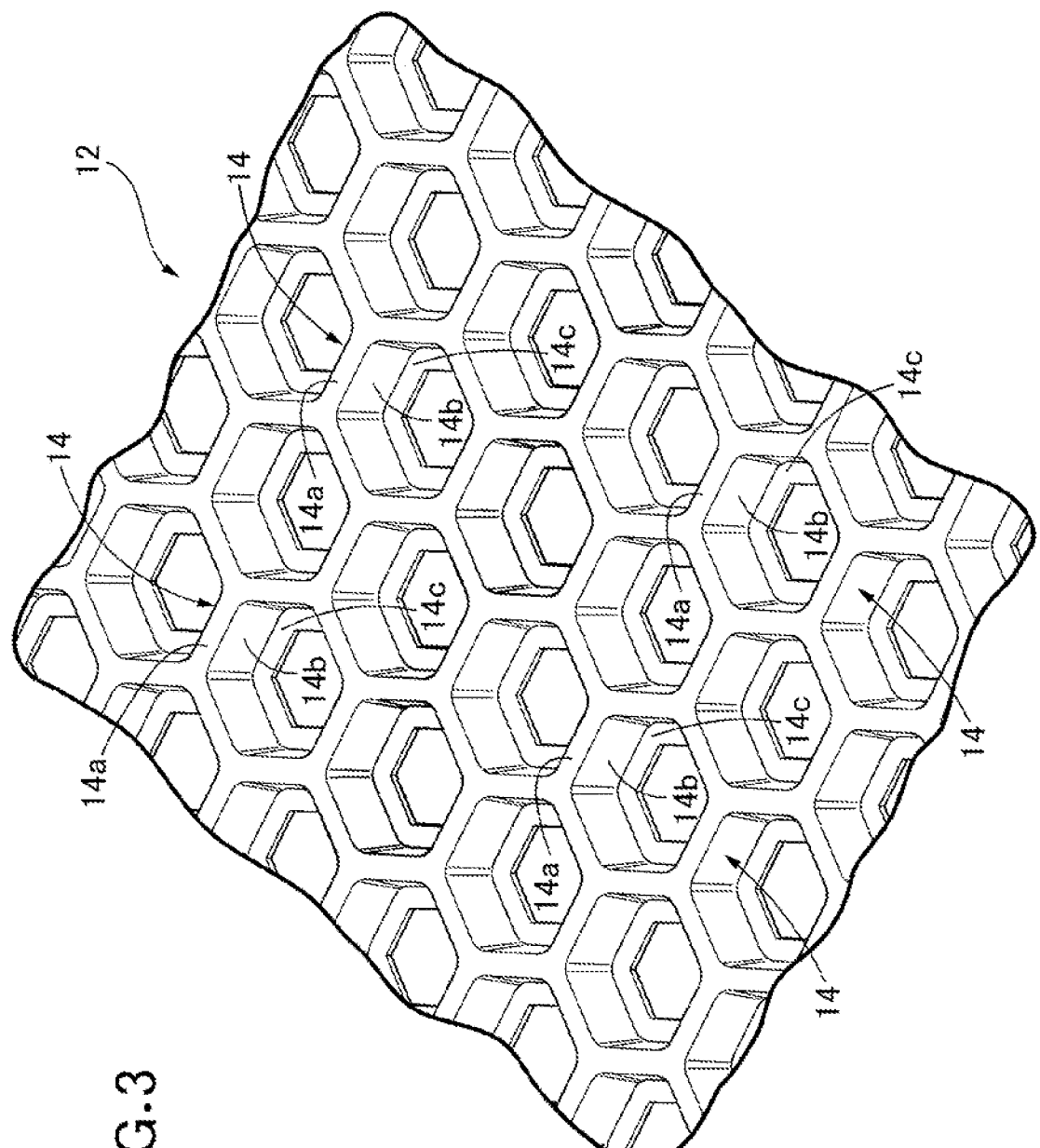
FIG. 3 is a perspective view of a honeycomb core. (first embodiment)

As shown in FIG. 1 to FIG. 3, a honeycomb panel 11 used as a floor panel of an automobile is formed from a honeycomb core 12 made of an aluminum alloy and a pair of CFRP plates 13 and 13 adhered to opposite faces of the honeycomb core 12. The CFRP plates 13 and 13 are formed by embedding a carbon fiber as a reinforcing material in the interior of a resin as a base material, and in the present embodiment in a state in which end parts of the pair of CFRP plates 13 and 13 are bent through right angles outside the honeycomb core 12, the end parts are superimposed on one another and adhered by an adhesive 15.

The honeycomb core 12 is formed by blow molding a material made of an aluminum alloy, and a regular hexagonal core unit 14 is repeatedly continuous within one plane (see FIG. 2). The basic shape of the core unit 14 is a polygon (regular hexagon) P comprising six sides S and six vertexes V; six polygons P are consecutively disposed around one polygon P while sharing six sides S, and three sides S intersect at each vertex V at an angle of 120°. Two core units 14 and 14 sharing one side S of the polygon P have a hat-shaped cross section (see FIG. 1) and include one top face 14a, two side faces 14b and 14b, and two flange faces 14c and 14c. Since the inner side of the flange face 14c on the inner peripheral side of the honeycomb core 12 opens in a regular hexagon shape, the weight of the honeycomb core 12 is lightened by a portion corresponding to the opening.

With regard to the honeycomb core 12, the top face 14a of the hat-shaped cross section part is adhered to one of the CFRP plates 13 with an adhesive 16, and the flange faces 14c and 14c of the hat-shaped cross section part are adhered to the other CFRP plate 13 with an adhesive 17. As a result, at a position corresponding to the side S of the polygon P with which two core units 14 and 14 are in contact, a trapezoidal closed cross-section part 18 extending linearly along the side S is formed from the top face 14a, the pair of side faces 14b and 14b, and the other CFRP plate 13, and three of the closed cross-section parts 18 are combined at the vertex V of the polygon P with an angle of intersection of 120°.

The side faces 14b and 14b of the two sides S, which are combined at the vertex V of the polygon P, are continuous with each other while being smoothly curved without forming a sharp angle (see FIG. 2).

The operation of the embodiment of the present invention having the above arrangement is now explained.

When a load from the foot of an occupant is applied to the honeycomb panel 11 used as a floor panel of an automobile in a direction that is orthogonal to the plane, as for a standard honeycomb panel, by transmitting the load inputted from one of the CFRP plates 13 to the honeycomb core 12 to the other CFRP plate 13 via the side faces 14b of the hat-shaped cross section part and dispersing it, high strength is exhibited despite of being light weight.

When a collision load in a direction parallel to the plane is applied to the honeycomb panel 11, the collision load transmitted via a load transmission path formed from one high strength linear closed cross-section part 18 of the honeycomb core 12 is dispersed to other load transmission paths formed from two closed cross-section parts 18 and 18 intersecting at the vertex V of the polygon P and transmitted, and this is repeated in sequence to thus disperse the collision load to the entire honeycomb panel 11, thus preventing localized breakage of the honeycomb panel 11 and thereby improving the energy-absorbing performance.

In this process, since the side faces 14b of the hat-shaped cross section parts intersecting at the vertex V of the polygon P are continuous with each other while being smoothly curved (see FIG. 2), a collision load transmitted via one load transmission path can be transmitted more efficiently to two other load transmission paths and dispersed.

Moreover, the honeycomb core 12 has isotropy since it is formed by continuously assembling a large number of regular hexagonal core units 14, and it can exhibit unchanged energy-absorbing performance regardless of whether the collision load is that of a frontal collision or the collision load is that of a side collision.

Figure 4:
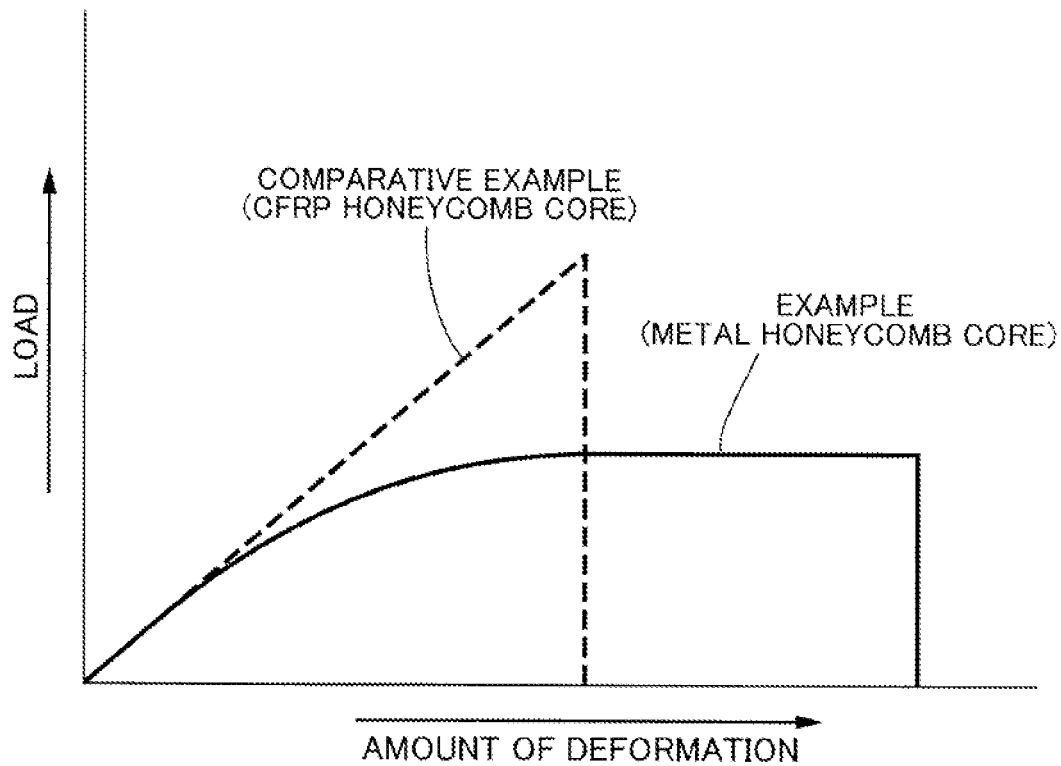
FIG. 4 is a graph showing the relationship between load and amount of deformation of the honeycomb core. (first embodiment)

Furthermore, since the honeycomb core 12 is made of an aluminum alloy, which is more ductile than one made of CFRP, as shown in FIG. 4, when the input load increases, it does not break suddenly but undergoes consecutive plastic deformation and exhibits a high energy-absorbing performance. Moreover, due to the honeycomb core 12 being blow molded, compared with press forming, deep drawing becomes possible, a sufficient thickness can be given to the honeycomb panel 11 with only one layer of honeycomb core 12, and the cost can be reduced due to the number of components being cut. Furthermore, since the honeycomb core 12 is made of an aluminum alloy, not only is it inexpensive compared with one made of CFRP, but it is also possible to carry out induction heating using an IH heater, thus enabling the curing time to be shortened by heating the adhesives 15, 16, and 17 with an IH heater during production and, furthermore, enabling swaging by utilizing the ductility of an aluminum alloy or welding to be carried out.

Second Embodiment

Figure 5:
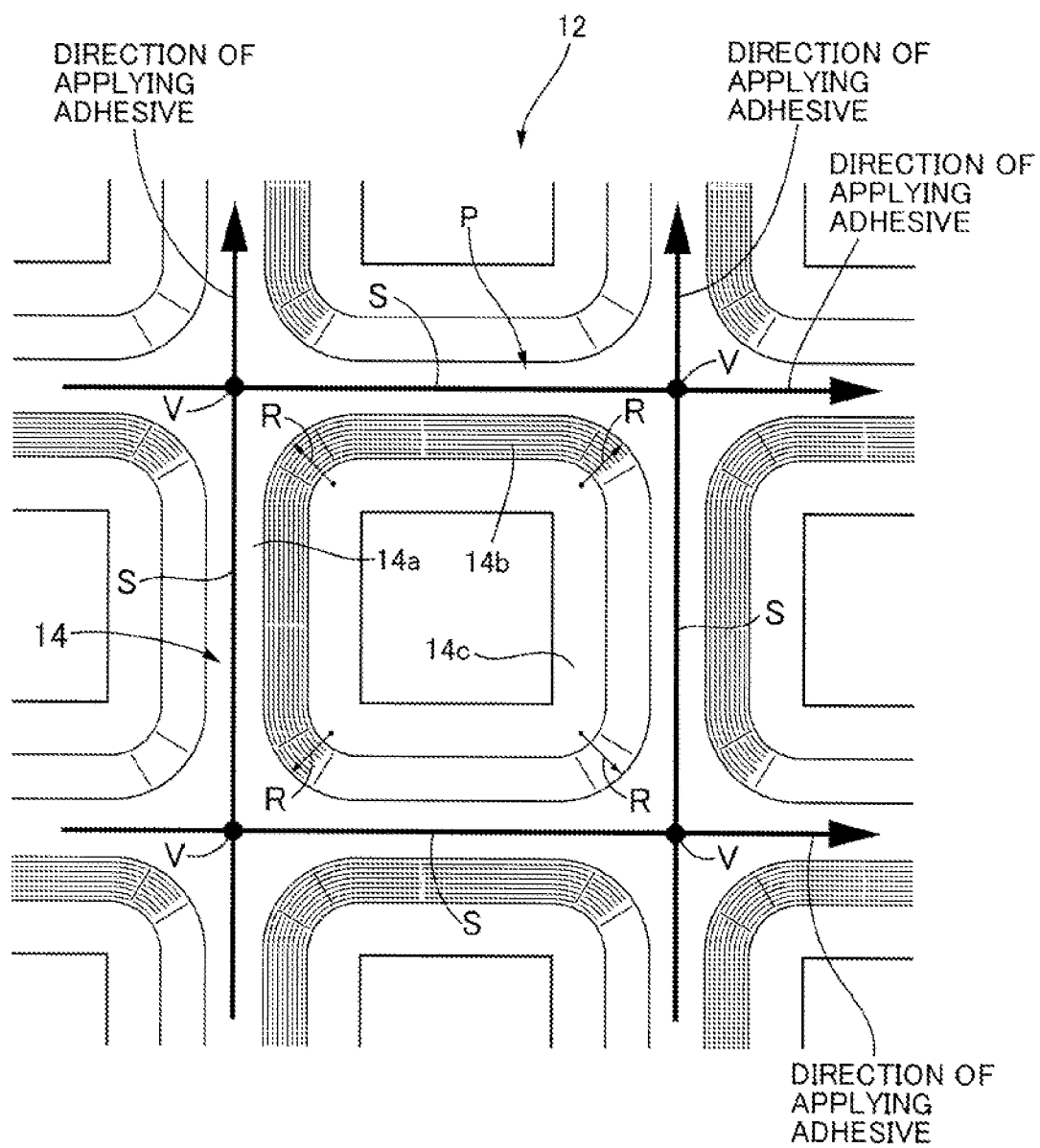
FIG. 5 is a diagram corresponding to FIG. 2. (second embodiment)

A second embodiment of the present invention is now explained by reference to FIG. 5.

In the first embodiment the core unit 14 is a regular hexagon, but the second embodiment is different in that the core unit 14 is a square. In accordance with the present embodiment, in addition to the operational effects of the first embodiment, since the top faces 14a and the flange faces 14c of the plurality of hat-shaped cross section parts, which are continuous, are aligned linearly, when a coating operation of the adhesive 16 or 17 is carried out using a robot, it is possible to move a robot arm linearly without moving it in a zig-zag manner, thus enabling a further operational effect of improving the operating efficiency to be achieved.

Third Embodiment

A third embodiment of the present invention is now explained by reference to FIG. 6.

The third embodiment is one in which, with regard to the honeycomb panel 11 of the first embodiment, two honeycomb cores 12 and 12 formed by press forming and not by blow molding are stacked into two layers and adhered by the adhesive 16 via the top faces 14a of the hat-shaped cross section parts. In this process, as the adhesive 17 for adhering the flange faces 14c of the hat-shaped cross section part of the honeycomb core 12 to the CFRP plates 13 and 13, a urethane-based elastic adhesive having a modulus of elasticity of 10 to 120 MPa is used. Furthermore, an epoxy-based adhesive is used as the adhesive 16 for adhering the top faces 14a of the hat-shaped cross section parts of the two honeycomb cores 12 and 12 to each other and as the adhesive 15 for adhering end parts of the CFRP plates 13 and 13 to each other.

In accordance with the present embodiment, since due to the honeycomb cores 12 being stacked as two layers, each layer of the honeycomb cores 12 can be made thinner compared with the first embodiment, it becomes possible to manufacture the honeycomb core 12 by press forming, for which deep drawing is difficult, and the manufacturing cost can be cut further. Furthermore, the CFRP plates 13 and 13, which are hard, have the problem that due to their modulus of elasticity being 230 to 650 MPa vibration can be transmitted easily, but since the flange faces 14c of the hat-shaped cross section parts of the honeycomb core 12 and the CFRP plates 13 and 13 are adhered by the urethane-based adhesive 17 having a low modulus of elasticity, vibration and noise of the honeycomb panel 11 can be reduced. Moreover, since the epoxy-based adhesive 16 for adhering the top faces 14a of the hat-shaped cross section parts to each other and the epoxy-based adhesive 15 for adhering end parts of the CFRP plates 13 and 13 to each other have a high adhesive strength compared with a urethane-based adhesive, the strength of the adhered parts can be increased and, furthermore, since the same type of members are adhered to each other the adhesive strength can be improved further.

Embodiments of the present invention are explained above, but the present invention may be modified in a variety of ways as long as the modifications do not depart from the spirit and scope thereof.

For example, the shape of the polygon P of the core unit 14 is not limited to a regular hexagon or a square and may be an equilateral triangle.

Furthermore, in the third embodiment, the top faces 14a of the hat-shaped cross section parts of the two honeycomb cores 12 and 12 are adhered to each other with the epoxy-based adhesive 16, but they may be adhered with a urethane-based elastic adhesive having a modulus of elasticity of 10 to 120 MPa. In accordance with this, it is possible to reduce the vibration and noise of the honeycomb panel 11 by the urethane-based adhesive 17 having a low modulus of elasticity.

The invention claimed is:

1. A vehicle floor panel in which a honeycomb core made of metal is sandwiched between two CFRP plates and adhered,
wherein the honeycomb core comprises a plurality of core units each formed into a polygon shape defined by a plurality of sides, the core units being continuous within one plane so as to share the sides of the polygon of each core unit with those of adjacently positioned, surrounding ones of the core units, each of the sides forms a hat-shaped cross section part by a raised top face, a pair of side faces extending downwards from the top face, and a pair of flange faces, and closed cross-section parts are formed by adhering one of the CFRP plates to the pair of flange faces such that the closed cross-section parts linearly extend along the sides and are continuous with each other at vertexes of the polygons of the adjacent core units.

2. The vehicle floor panel according to claim 1, wherein the core units are each a square shape or an equilateral triangle shape.

3. The vehicle floor panel according to claim 1, wherein a pair of the honeycomb cores are adhered to each other via the respective top faces of the hat-shaped cross section parts.

4. The vehicle floor panel according to claim 3, wherein the flange faces of the hat-shaped cross section part of the pair of honeycomb cores are adhered to the CFRP plate by an urethane-based adhesive having a modulus of elasticity of 10 to 120 MPa.

5. The vehicle floor panel according to claim 3, wherein the top faces of the hat-shaped cross section parts of the pair of honeycomb cores are adhered to each other by an epoxy-based adhesive.

6. The vehicle floor panel according to claim 3 wherein the top faces of the hat-shaped cross section parts of the pair of honeycomb cores are adhered to each other by an urethane-based adhesive having a modulus of elasticity of 10 to 120 MPa.

7. The vehicle floor panel according to claim 1, wherein end parts of the two CFRP plates are adhered to each other by an epoxy-based adhesive.

8. The vehicle floor panel according to claim 1, wherein the side faces of hat-shaped cross section parts that are adjacent to each other are continuous while being smoothly curved.

9. A manufacturing method for the vehicle floor panel according to claim 1, wherein an adhesive is cured by induction heating (IH) the honeycomb core by an IH heater.

10. A manufacturing method for the vehicle floor panel according to claim 1, wherein the honeycomb core is manufactured by deep drawing an aluminum plate by blow molding.

11. The vehicle floor panel according to claim 1, wherein the raised top face is shared by adjacent two core units, and
one of the pair of side faces constitutes one of the adjacent two core units and the other of the pair of side faces constitutes the other of the adjacent two core units.

* * * * *